(12) United States Patent
Schaaf

(10) Patent No.: US 9,062,689 B2
(45) Date of Patent: Jun. 23, 2015

(54) COMPRESSED-AIR-OPERATED VACUUM GENERATOR OR VACUUM GRIPPER

(75) Inventor: Walter Schaaf, Freudenstadt-Gruental (DE)

(73) Assignee: J. SCHMALZ GMBH, Glatten (DE)

( * ) Notice: Subject to any disclaimer, the term of this patent is extended or adjusted under 35 U.S.C. 154(b) by 346 days.

(21) Appl. No.: 13/511,585

(22) PCT Filed: Nov. 18, 2010

(86) PCT No.: PCT/EP2010/067770
§ 371 (c)(1),
(2), (4) Date: Oct. 3, 2012

(87) PCT Pub. No.: WO2011/064138
PCT Pub. Date: Jun. 3, 2011

(65) Prior Publication Data
US 2013/0032981 A1    Feb. 7, 2013

(30) Foreign Application Priority Data
Nov. 24, 2009   (DE) .................. 10 2009 047 083

(51) Int. Cl.
| B25B 11/00 | (2006.01) |
| F04F 5/42 | (2006.01) |
| B05B 7/12 | (2006.01) |
| F04F 5/16 | (2006.01) |
| B65G 47/91 | (2006.01) |
| F04F 5/54 | (2006.01) |

(52) U.S. Cl.
CPC . F04F 5/16 (2013.01); B65G 47/91 (2013.01); F04F 5/54 (2013.01)

(58) Field of Classification Search
USPC ............... 269/21; 60/204, 738; 417/171, 157, 417/197, 54
See application file for complete search history.

(56) References Cited

U.S. PATENT DOCUMENTS

| 1,333,713 | A | * | 3/1920 | Hopkins ................... 417/151 |
| 2,044,088 | A | * | 6/1936 | Lord ......................... 417/151 |
| 2,938,658 | A | * | 5/1960 | Foster ....................... 417/171 |
| 2,965,312 | A | * | 12/1960 | Hale ........................ 239/416.5 |
| 3,739,576 | A | * | 6/1973 | Chamberlain ................ 60/738 |
| 3,806,039 | A | * | 4/1974 | Mocarski ................. 239/417.3 |
| 4,046,492 | A | * | 9/1977 | Inglis ........................ 417/197 |
| 4,245,961 | A | * | 1/1981 | Bunting et al. ............ 417/171 |
| 4,749,336 | A | * | 6/1988 | Rojey .......................... 417/54 |
| 5,125,579 | A | * | 6/1992 | Eggert ....................... 239/439 |
| 5,344,079 | A | * | 9/1994 | Tasaki et al. ............... 239/498 |
| 6,718,752 | B2 | * | 4/2004 | Nesbitt et al. ................ 60/204 |
| 6,854,260 | B2 | * | 2/2005 | Anderson ..................... 60/204 |
| 8,807,458 | B2 | * | 8/2014 | Al-Ansary ................... 239/505 |

FOREIGN PATENT DOCUMENTS

| GB | 646 124 A | 11/1950 |
| GB | 2 455 351 A | 6/2009 |
| WO | WO 99/49216 A1 | 9/1999 |

* cited by examiner

*Primary Examiner* — Lee D Wilson
*Assistant Examiner* — Alvin Grant
(74) *Attorney, Agent, or Firm* — Henry Feiereisen LLC

(57) ABSTRACT

The invention relates to a compressed-air-operated vacuum generator or vacuum gripper having at least two vacuum units, wherein each vacuum unit has a suction chamber, an intake opening which opens into the suction chamber, an outflow opening which opens out of the suction chamber, and at least one drive air opening which opens into the outflow opening between the intake opening and the outflow opening, and wherein the vacuum units operate on the basis of at least two different principles (Venturi, Bernoulli, Coanda, vortex, etc.) for generating a negative pressure.

13 Claims, 8 Drawing Sheets

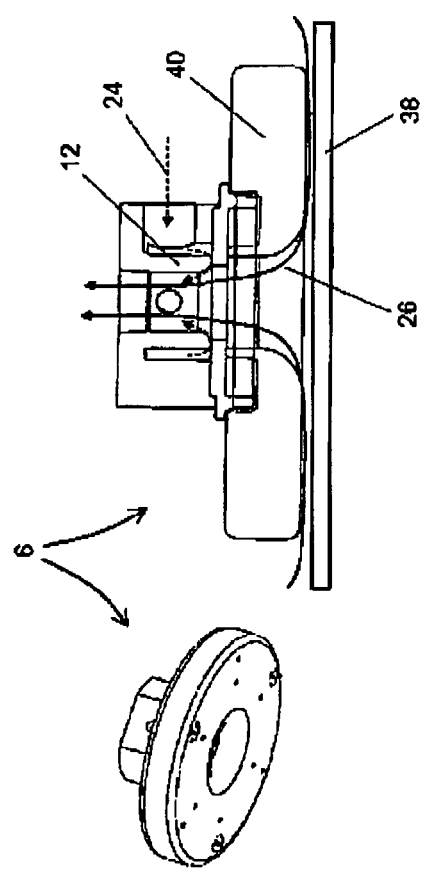

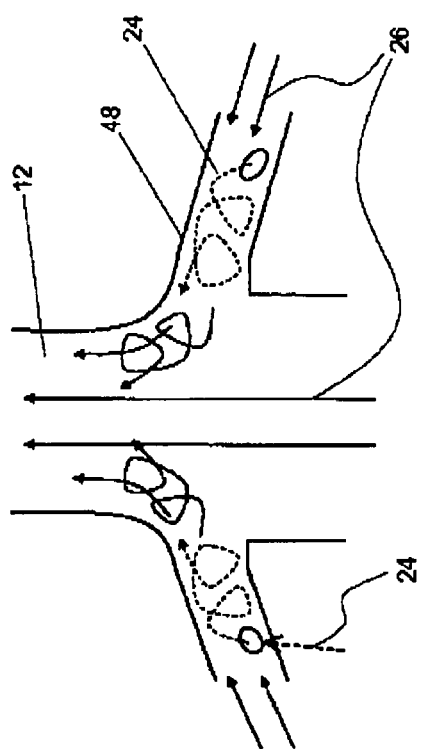

COMPRESSED-AIR-OPERATED VACUUM GENERATOR OR VACUUM GRIPPER

CROSS-REFERENCES TO RELATED APPLICATIONS

This application is the U.S. National Stage of International Application No. PCT/EP2010/067770, filed Nov. 18, 2010, which designated the U.S and has been published as International Publication No. WO 2011/064138 and which claims the priority of German Patent Application, Ser. No. 10 2009 047 083.2, filed Nov. 24, 2009, pursuant to 35 U.S.C. 119(a)-(d).

BACKGROUND OF THE INVENTION

The invention relates to a compressed-air-operated vacuum generator or vacuum gripper.

Multi-stage ejectors with cascaded Venturi nozzles are known, for example, from WO 99/49216 and from the companies Piab, SMC and Vtec. A feature of the multi-stage principle is that the exhaust jet of an upstream stage is the drive air jet of the downstream stage. For example, a combination of the Coanda principle with the Venturi principle may be useful for increasing the suction volume flow. General vacuum generating principles are the Venturi principle with a jet nozzle and a receiver nozzle, the Bernoulli principle, wherein "fast" air with high dynamic pressure produces of a static negative pressure, and the Coanda principle, wherein the air follows a curved surface.

It is an object of the invention to provide a vacuum generator or vacuum gripper capable of efficiently generating a negative pressure.

SUMMARY OF THE INVENTION

This object is attained with a vacuum generator or vacuum gripper having at least two vacuum units, wherein each vacuum unit includes a suction chamber, an intake opening which opens into the suction chamber, at least one outlet opening which exits from the suction chamber, and at least one compressed air or drive air opening which opens into the outlet opening. The at least two vacuum units operate according to at least two different principles for generating a negative pressure.

The multi-stage ejector according to present invention includes at least two vacuum generation stages. The exhaust jet of an upstream vacuum generating step hereby forms the drive air jet of a downstream vacuum generation stage, whereby at least two different vacuum generation principles are employed.

The following advantages are hereby attained. By combining a principle for high volume flow with a principle for high vacuum, the object to be sucked quickly moves against the intake device due to the high volume flow and is strongly retained due to the high negative pressure.

According to the invention, the vacuum unit may here be a vacuum nozzle, an ejector and/or a vacuum generating stage and may, for example, operate according to the Venturi principle, the Bernoulli principle, the Coanda principle or the vortex principle.

According to a further embodiment of the invention, at least one exhaust port of a vacuum unit opens into the drive air port of the other vacuum unit. The two vacuum units are connected in series.

Advantageously, the vacuum units are combined in parallel and/or in series. One or more vacuum units connected in parallel may here be arranged downstream of the one vacuum unit.

Advantageously, the vacuum units may be housed in a common housing to reduce the construction volume.

According to a further embodiment of the invention, at least two different suction chambers may be separated from each other or connected to one another by one or more movable flaps. With these flaps, which are preferably designed as a non-return swing valves, the volume flows and the resulting negative pressures can be specifically controlled.

The closing or opening of the flaps may be controllable, in particular automatically, depending on the vacuum pressure and/or the volume flow.

Advantageously, a blower system opening into the suction chamber may be provided so that the negative pressure can be rapidly relieved and the sucked-in workpiece can be quickly ejected.

Preferably, one or more sensors are provided for detecting the flow and/or pressure conditions, in particular in the suction chamber.

According to a further embodiment of the invention, the vacuum units operating according to at least two different principles for generating negative pressure operate simultaneously or sequentially. One vacuum unit may hereby be used for generating a high volume flow and the other vacuum unit for generating a high negative pressure.

Further advantages, features and details of the invention will become apparent from the description and the accompanying drawings. The features shown in the drawings and described in the description may be important for the invention individually and in any combination.

BRIEF DESCRIPTION OF THE DRAWINGS

The drawings show in:

FIG. 7 a combination of the Coanda and the Bernoulli principle with inwardly guided exhaust air flow for sucking in air and for generating a suction force, and FIG. 8 a combination of the vortex and the Coanda principle.

DETAILED DESCRIPTION OF PREFERRED EMBODIMENTS

Figure 1:
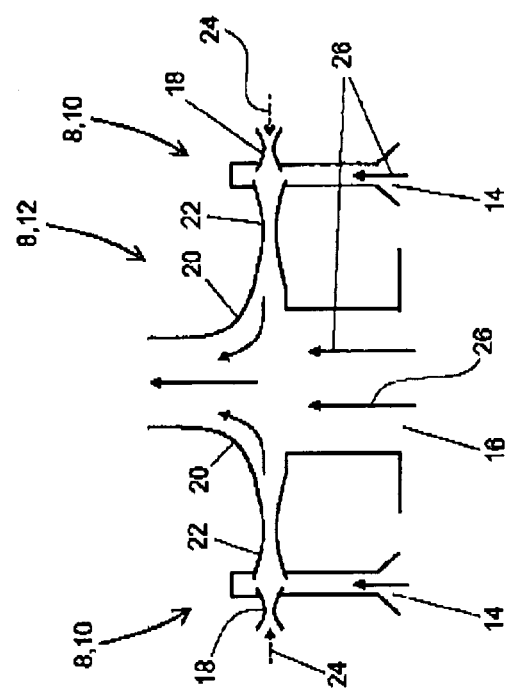
FIG. 1 a combination of the Venturi and the Coanda principle with separate vacuum chambers (Venturi nozzle circumferential or several individual nozzles)

FIG. 1 shows a combination of two vacuum units 8, namely a Venturi nozzle 10 and a Coanda nozzle 12 with separate vacuum chambers 14 and 16, wherein the Venturi nozzle 10 may be formed circumferentially or as several individual nozzles. The reference numeral 18 denotes the compressed air port of the Venturi nozzle 10 and the reference numeral 20 denotes the compressed air supply of the Coanda nozzle 12. The exhaust air port 22 of the Venturi nozzle 10 opens into the compressed air port 20 of the Coanda nozzle 12. The reference numeral 24 denotes the compressed air and the reference numeral 26 the suction air.

Figure 2:
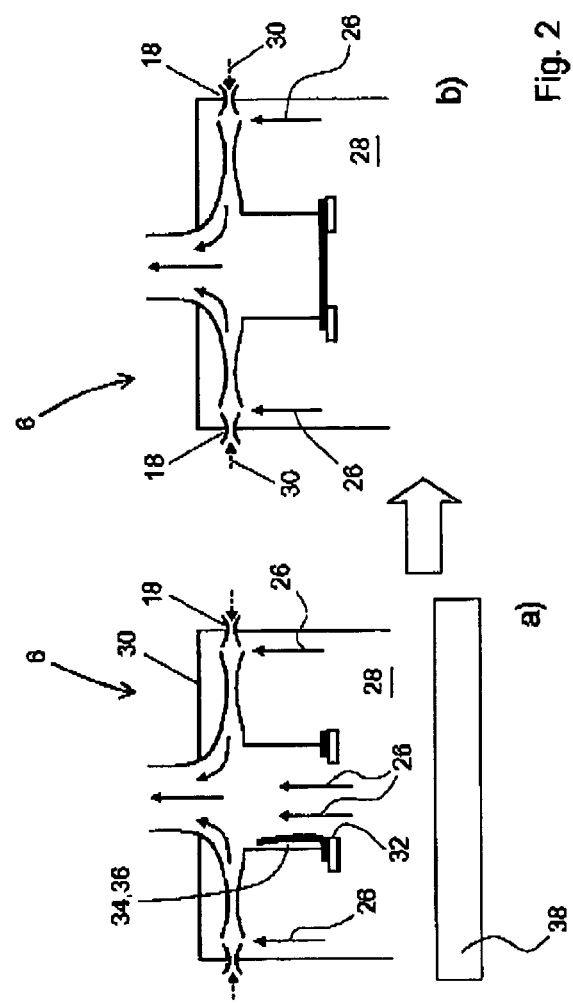
FIG. 2 a combination of the Venturi and the Coanda principle with a single vacuum chamber, wherein the exhaust air flow of the Venturi nozzles represents the drive air flow of the Coanda nozzle (Venturi nozzle circumferential or several individual nozzles)

FIG. 2 shows a vacuum gripper 6 with the combination of the Venturi nozzle 10 with the Coanda nozzle 12 according to FIG. 1 with a single, common vacuum chamber 28. The compressed air port 18 is here integrated in a housing 30 which also encompasses the suction chamber 28. FIG. 2a) shows the beginning of the intake process, in which a high volume flow is generated. A flap 34, in particular a swing check valve 36, which is moved by the suction flow 26 into the open position, is attached downstream of the intake opening 32 of the Coanda nozzle 12. When a workpiece 38 is sucked in, the volume flow gradually decreases, closing the flap 34, as illustrated in FIG. 2b). The Coanda nozzle 12 is now switched off, so that only the Venturi nozzle 10 is operated. The volume flow decreases again as a result, thereby increasing the negative pressure in the vacuum chamber 28.

According to the invention, one vacuum unit 8 is primarily used for generating a high volume flow, while the other one vacuum unit 8 is used for generating a high negative pressure.

Figure 3:
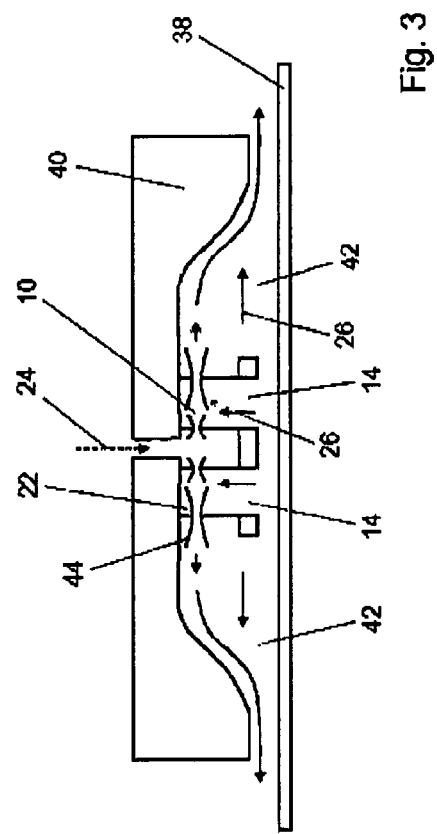
FIG. 3 a combination of the Venturi and the Bernoulli principle with separate vacuum chambers (Venturi nozzle circumferential or several individual nozzles)

FIG. 3 shows a combination of other vacuum units 8, namely, a Venturi nozzle 10 and a Bernoulli nozzle 40 with separate vacuum chambers 14 and 42, wherein the Venturi nozzle 10 may be formed circumferentially or from several individual nozzles. The exhaust port 22 of the Venturi nozzle 10 opens here also into the compressed air port 20 of the Bernoulli nozzle 40.

Figure 4:
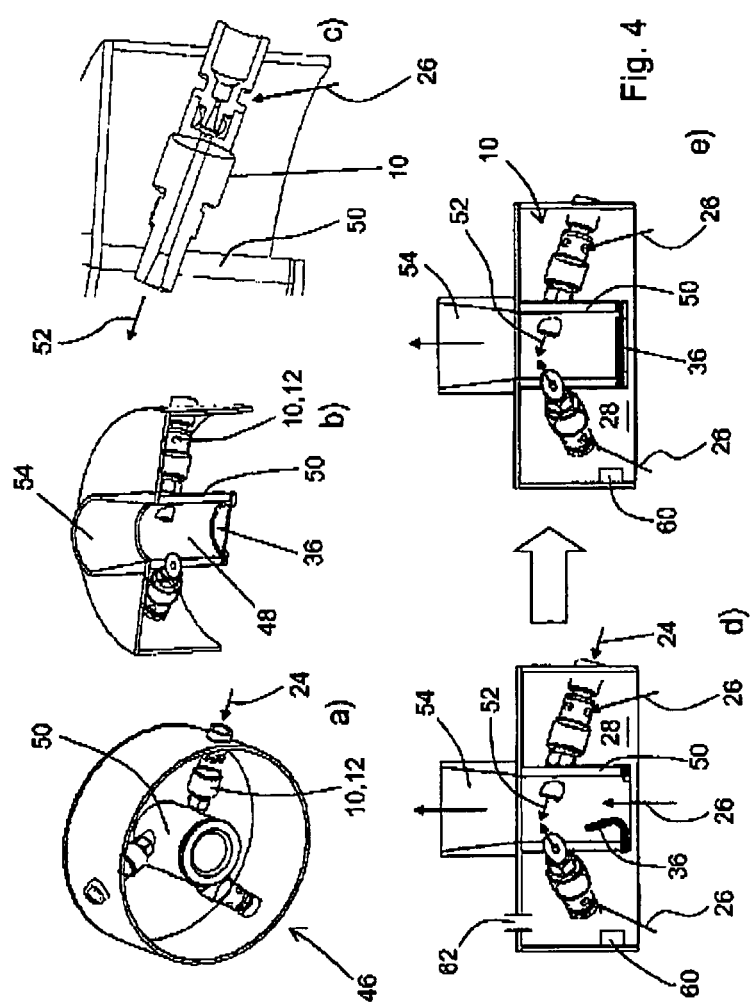
FIG. 4 a multi-stage ejector with a combination of a Venturi nozzle with a vortex nozzle in different views. The Venturi nozzles may here also be formed as a Coanda nozzles.

FIG. 4 shows a multi-stage ejector 46 with a combination of a Venturi nozzle 10 with a vortex nozzle 48 in various views. The Venturi nozzles 10 may here also be formed as Coanda nozzles 12. The Venturi nozzle 10 opens into a central main flow channel 50 such that the exhaust air flow 52 is inclined towards the outlet opening 54 (FIGS. 4c) and 4d)). In addition, the exhaust air flow 52 flows into the central main flow channel 50 at an angle, which lies between the radial direction and the tangential direction (FIGS. 4a) and 4b)). This produces in the central main flow channel 50 a vortex which is directed towards the outlet opening 54 causing suction air 26 to be sucked in through the lower opening of the central main flow channel 50. The swing check valve 36 then opens at the beginning of the intake process due to a high volume flow. However, the produced negative pressure, is still low (FIG. 4d)). As soon as the flow rate decreases, as illustrated in FIG. 4e), the swing check valve 36 closes and only suction air 26 is sucked in through the Venturi nozzles 10. This causes an increase of the negative pressure in the vacuum chamber 28. The reference numeral 60 denotes a sensor, in particular a vacuum sensor. The reference numeral 62 denotes a separately controllable blower system, with which the negative pressure in the vacuum chamber 28 can be rapidly relieved following the suction process.

Figure 5:
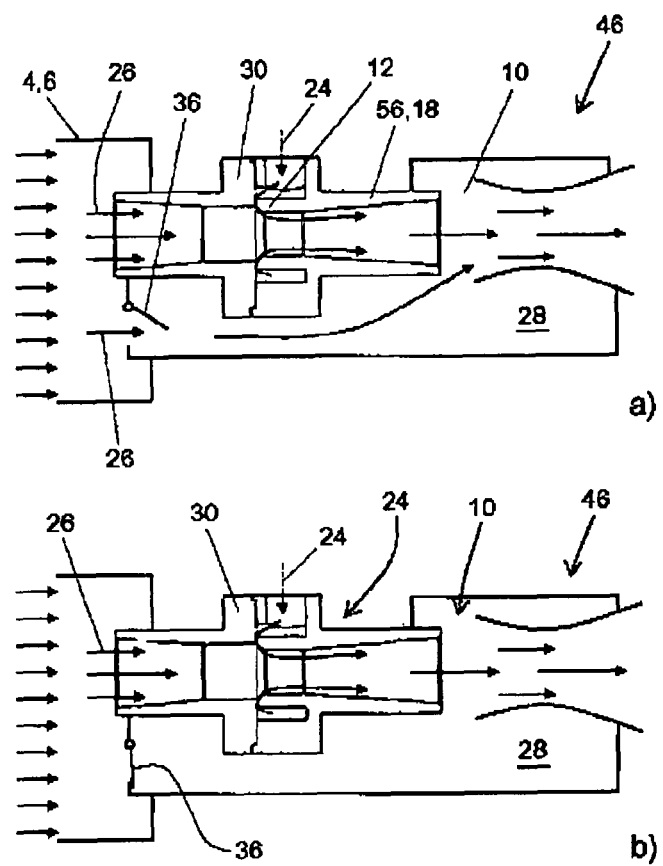
FIG. 5 a multi-stage ejector with a combination of a Coanda nozzle with a Venturi nozzle.

FIG. 5 shows a multi-stage ejector 46 with a combination of a Coanda nozzle 12 and a Venturi nozzle 10 for operating the vacuum gripper 6, e.g. an area suction gripper. The compressed air 24 flows radially into the Coanda nozzle 12, and suction air 26 is sucked centrally into the housing 30. The exhaust port 56 of the Coanda nozzle 12 serves as a compressed air port 18 for the Venturi nozzle 10. The swing check valve 36 opens at the beginning of the intake process due to a high volume flow. The generated negative pressure is still low (FIG. 5a)). As soon as the volume flow decreases, as shown in FIG. 5b), the swing check valve 38 closes and only suction air 26 is sucked in via the Coanda nozzle 12. The negative pressure in the vacuum chamber 28 is thereby increased.

Figure 6:
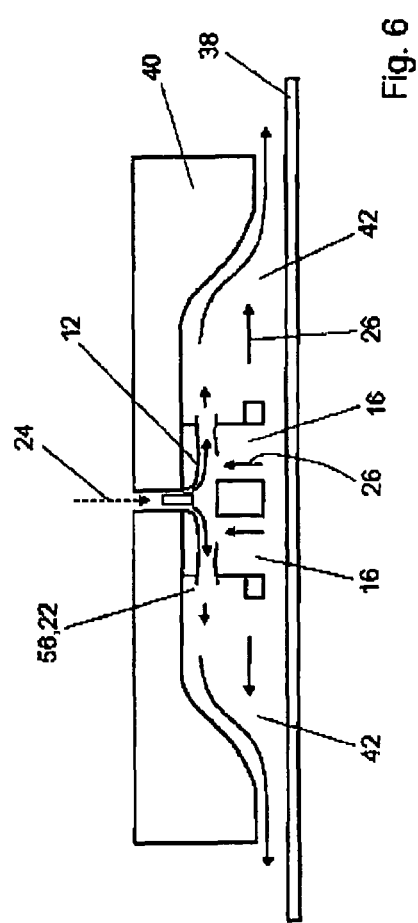
FIG. 6 a combination of the Coanda and the Bernoulli principle with outwardly guided exhaust air flow.

FIG. 6 shows a combination of a Coanda nozzle 12 and a Bernoulli nozzle 40, similar to FIG. 3 with separate vacuum chambers 16 and 42. The exhaust port 56 of the Coanda nozzle 12 serves as a compressed air port 20 for the Bernoulli nozzle 40.

FIG. 7 shows a vacuum gripper 6 with a combination of a Coanda nozzle 12 and a Bernoulli nozzle 40 with an inwardly guided air stream for drawing in suction air 26 and for generating a suction force for the workpiece 38. Spacers 58 may be provided on the underside of the vacuum gripper 6 for maintaining a permanent flow of suction air 26 even when the workpiece 38 is drawn in.

FIG. 8 shows a combination of a Vortex nozzle 48 and a Coanda nozzle 12. The inflow direction of the compressed air 24 into the Vortex nozzle 48 corresponds to the embodiment of FIG. 4, so that a twist which sucks in the suction air 26 is produced in the Vortex nozzle 48. This twisting exhaust air flow flows substantially radially into the Coanda nozzle 12 and generates a central suction air flow.

The invention claimed is:

1. A compressed-air-operated vacuum generator or vacuum gripper with at least two vacuum units, each vacuum unit comprising:
    a suction chamber,
    an intake opening which opens into the suction chamber,
    an outlet opening which exits from the suction chamber, and
    at least one drive air opening which opens into the outlet opening, wherein the outlet opening of one of the at least two vacuum units opens into the at least one drive air opening of another of the at least two vacuum units, wherein the at least two vacuum units operate according to at least two different principles for compressed-air-driven generation of a negative pressure.

2. The vacuum generator or vacuum gripper of claim 1, wherein the at least two vacuum units comprise at least one unit selected from a vacuum nozzle, an ejector and a vacuum-generating stage.

3. The vacuum generator or vacuum gripper of claim 1, wherein the at least two vacuum units are connected in series.

4. The vacuum generator or vacuum gripper of claim 1, wherein the at least two vacuum units are arranged in a common housing.

5. The vacuum generator or vacuum gripper of claim 1, wherein the suction chambers of the at least two different vacuum units are separated from each other.

6. The vacuum generator or vacuum gripper of claim 1, wherein the suction chambers of the at least two different vacuum units are connected to one another by at least one movable flap.

7. The vacuum generator or vacuum gripper of claim 6, wherein the at least one movable flap is controllably closed or opened depending on vacuum pressure or volume flow rate, or both.

8. The vacuum generator or vacuum gripper of claim 1, wherein the at least two different principles are selected from the group consisting of Venturi principle, Bernoulli principle, Coanda principle and vortex principle.

9. The vacuum generator or vacuum gripper of claim 1, further comprising a blower system.

10. The vacuum generator or vacuum gripper of claim 1, further comprising a sensor detecting at least one of flow conditions and pressure conditions.

11. The vacuum generator or vacuum gripper of claim 10, wherein the sensor is constructed to detect the at least one of flow conditions and pressure conditions in the suction chamber.

12. The vacuum generator or vacuum gripper of claim 1, wherein the at least two vacuum units vacuum units operate simultaneously.

13. The vacuum generator or vacuum gripper of claim 1, wherein the at least two vacuum units vacuum units operate sequentially.

* * * * *